(12) United States Patent
Anderson et al.

(10) Patent No.: US 9,436,670 B2
(45) Date of Patent: Sep. 6, 2016

(54) WEBPAGE BASED FORM ENTRY AID

(71) Applicant: International Business Machines Corporation, Armonk, NY (US)

(72) Inventors: Taylor J. Anderson, Atlanta, GA (US); Thomas S. Brugler, Fuquay-Varina, NC (US); Richard Chen, Long Island City, NY (US); Randall A. Craig, Raleigh, NC (US); Kristin S. Moore, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/306,810

(22) Filed: Jun. 17, 2014

(65) Prior Publication Data

US 2015/0363376 A1 Dec. 17, 2015

(51) Int. Cl.
G06F 17/24 (2006.01)
G06F 3/0481 (2013.01)
G06F 9/44 (2006.01)

(52) U.S. Cl.
CPC ......... *G06F 17/243* (2013.01); *G06F 3/04817* (2013.01); *G06F 9/4446* (2013.01)

(58) Field of Classification Search
None
See application file for complete search history.

(56) References Cited

U.S. PATENT DOCUMENTS

| | | | | |
|---|---|---|---|---|
| 5,704,029 A * | 12/1997 | Wright, Jr. | ............ | G06F 17/243 345/173 |
| 2008/0028289 A1 * | 1/2008 | Hicks | .................... | G06F 17/243 715/224 |
| 2008/0082909 A1 * | 4/2008 | Zuverink | .............. | G06F 3/0481 715/224 |
| 2008/0215976 A1 * | 9/2008 | Bierner | .................. | G06Q 99/00 715/708 |
| 2009/0109455 A1 * | 4/2009 | Smith | .................... | G06F 17/243 358/1.9 |
| 2011/0087739 A1 | 4/2011 | Lin et al. | | |

(Continued)

FOREIGN PATENT DOCUMENTS

WO 2013181668 A1 12/2013
WO 2014009736 A1 1/2014

OTHER PUBLICATIONS

Brunskill et al., "Evaluating the Accuracy of Data Collection on Mobile Phones: A Study of Forms, SMS, and Voice", Masachusetts Institute of Technology and Microsoft Research India, Sep. 22, 2008.

(Continued)

*Primary Examiner* — Asher Kells
(74) *Attorney, Agent, or Firm* — Christopher McLane; Daniel R. Simek

(57) ABSTRACT

Embodiments of the present invention disclose a method, computer program product, and system for providing an interface for data entry into a webform. In one embodiment, the method includes receiving a selection of an active data-entry field, determining an inline label associated with the active data-entry field, determining which data-entry fields are required data-entry fields, and determining a location of an active data-entry field within a webform. The method further includes calculating an estimated time to complete the webform based on historical data for the active data-entry field and mobile webform. The method further includes providing an interface for the webform that includes information corresponding to the active data-entry field, the determined inline label, an indication of whether or not the active data-entry field is required, the calculated estimated time to complete the webform, and an indication of the determined location of the active data-entry field within the webform.

19 Claims, 5 Drawing Sheets

(56) References Cited

U.S. PATENT DOCUMENTS

| | | |
|---|---|---|
| 2011/0214067 A1 | 9/2011 | Tanaka |
| 2011/0258345 A1 | 10/2011 | Bhanote |
| 2011/0314376 A1* | 12/2011 | Dearman .............. G06F 9/4446 715/711 |
| 2013/0326392 A1 | 12/2013 | Maltesson |
| 2013/0332804 A1 | 12/2013 | Seaman et al. |

OTHER PUBLICATIONS

Dorigo et al., "Nonvisual Presentation and Navigation within the Structure of Digital Text-Documents on Mobile Devices", UAHCI/HCII, Part III, LNCS 8011, pp. 311-320, 2013, Springer-Verlag Berlin Heidelberg 2013.

* cited by examiner

WEBPAGE BASED FORM ENTRY AID

BACKGROUND OF THE INVENTION

The present invention relates generally to the field of mobile computing, and more particularly to entering data into a mobile webpage form.

Mobile computing is any type of computing by which a computing device is capable of transportation during normal usage. Mobile computing devices utilize the Internet or intranet and respective communications links, such as wide area network (WAN), local area network (LAN), wireless local area network (WLAN), to access digital content. Mobile computing devices are any computing devices not constrained in location to a desktop or data center, such as portable computers (e.g., laptops, ultrabooks, netbooks, tablet computers, e-book readers), mobile phones (e.g., cell phones, smart phones, phonepads), personal digital assistants (PDAs), media players, and mobile gaming consoles.

Current technology and applications rely on the existence of mobile devices exchanging information and forming communication networks with the Internet. The Internet is a global system of interconnected computer networks linking computing devices worldwide to private, public, academic, business, and government networks carrying an extensive range of information resources and services (e.g., interlinked hypertext documents and applications of the World Wide Web (WWW). Requests for information, transactions, and additional services provided on the Internet are based upon a user completing a webpage specific webform or mobile webform. Mobile webforms are modified electronic or digital webform applications that function on a mobile computing device, allowing a user to enter data that is sent to a server for processing. By inputting appropriate information on a mobile device connected to the Internet, data and transactions of all types can be requested and completed conveniently on demand by mobile computing devices.

SUMMARY

Aspects of the present invention disclose a method, computer program product, and system for providing an interface for data entry into a webform. The method includes one or more processors receiving a selection of an active data-entry field in a webform. The method further includes one or more processors determining an inline label associated with the active data-entry field. The method further includes one or more processors determining which data-entry fields in the webform are required data-entry fields. The method further includes one or more processors determining a location of an active data-entry field within a webform. The method further includes one or more processors calculating an estimated amount of time to complete the webform based on historical data for the active data-entry field and the mobile webform. The method further includes one or more processors providing an interface for the webform that includes information corresponding to the active data-entry field, wherein the information corresponding to the active data-entry field includes the determined inline label, an indication of whether or not the active data-entry field is a required data-entry field, the calculated estimated time to complete the webform, and an indication of the determined location of the active data-entry field within the webform.

DETAILED DESCRIPTION

Embodiments of the present invention recognize that mobile computing devices are capable of accessing information over the mobile web (i.e., the World Wide Web) through browser based Internet services at any time and from any location with an Internet connection. Despite convenience, research suggests mobile computing devices have a higher abandonment rate on mobile webforms in comparison to desktop computing webform completion, indicating users prefer desktop computers when entering long or complex webforms over the Internet. Some sources of abandonment of mobile webforms on mobile computing devices are the size of the viewable area, comprehension of requested data, navigation within the mobile webform, and user feedback. Mobile computing devices are limited in the size of the viewable area, causing difficulties in viewing a mobile webform and the information within a mobile webform, due to small screen sizes and items such as a virtual keyboard. Data comprehension may be inhibited, especially for visually impaired users, by a common practice in mobile web design of embedding text labels inside the entry fields. These entry field labels are referred to as HTML placeholders (e.g., inline labels, watermark hints, ghost text) and can appear in a light grey color within the text box and disappear when a user accesses the text box (i.e., user begins to enter text information in the text box). Navigation within a mobile webform is also limited when the mobile webform is not optimized for mobile computing devices, and the content area is large. Screen sizes of mobile devices are typically small, and the mobile device may not have a scroll wheel or hoverbox feature enabled. In addition to the aforementioned limitations, users may become frustrated with the lack of information and feedback provided within a mobile webform.

Embodiments of the present invention address issues of abandonment by creating a visual display area on a mobile computing device and adding accessibility features. Embodiments of the present invention provide a viewable area containing relevant data corresponding to an active field of a mobile webform (i.e., the mobile webform field where text is being entered). Within the viewable area, embodiments of the present invention provide user feedback in the manner of help, form messages, and required field notations. Also within the viewable area, embodiments of the present invention provide user feedback through mobile webform completion status and an estimated time to complete. Additionally, embodiments of the present invention address issues of navigation, by providing a mobile webform overview and a means to navigate within the mobile webform.

Figure 1A:
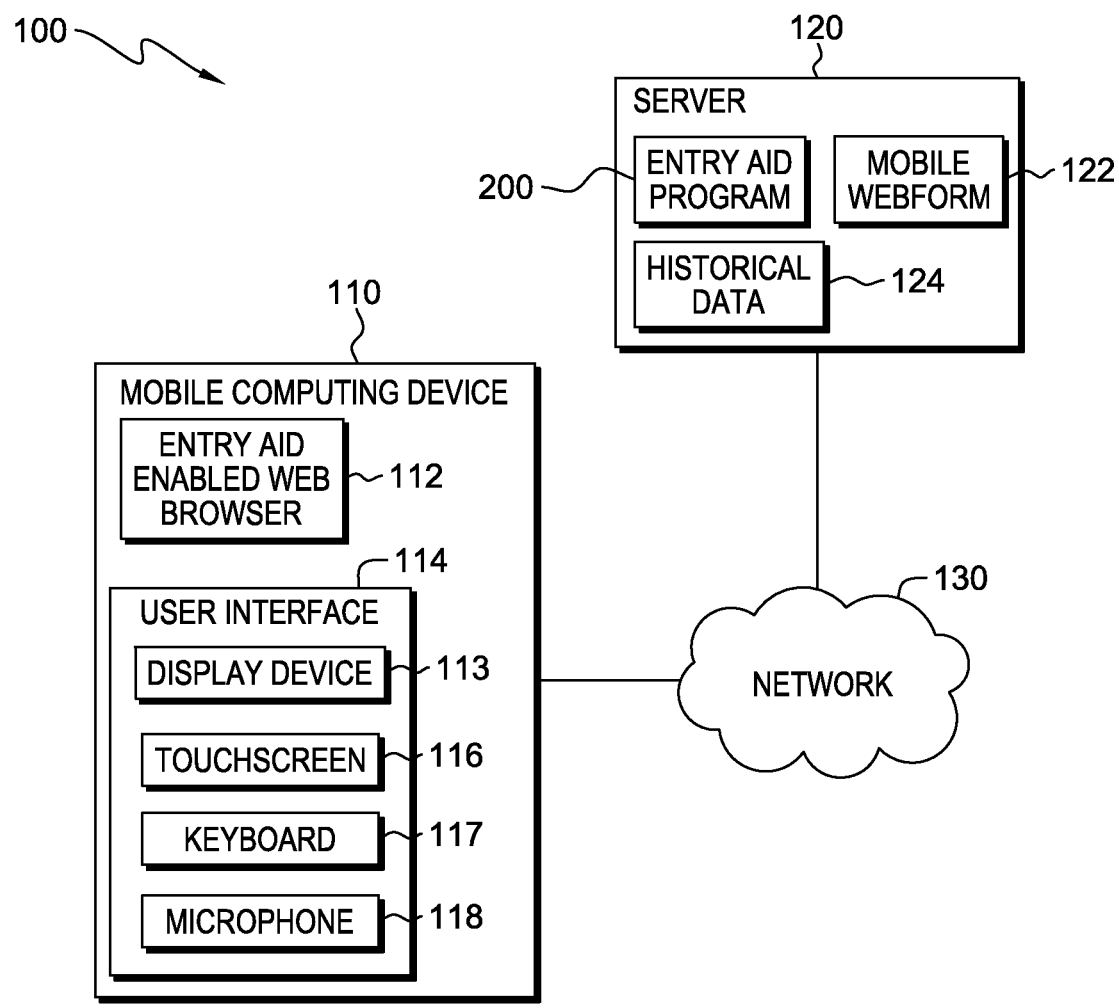
FIG. 1A is a functional block diagram illustrating a mobile computing environment, in accordance with an embodiment of the present invention.

FIG. 1A depicts a functional block diagram illustrating mobile computing environment 100, in accordance with an embodiment of the present invention. FIG. 1A provides only an illustration of one embodiment and does not imply any limitations with regard to the environments in which different embodiments may be implemented.

In the depicted embodiment, mobile computing environment 100 includes mobile computing device 110 and server 120, interconnected over network 130. Mobile computing environment 100 may include additional computing devices, mobile computing devices, severs, computers, storage devices, or other devices not shown. Network 130 may be a local area network (LAN), a wide area network (WAN) such as the Internet, a wireless local area network (WLAN), any combination thereof, or any combination of connections and protocols that will support communications between mobile computing device 110, server 120, and other computing devices and servers (not shown), in accordance with embodiments of the inventions. Network 130 may include wired, wireless, or fiber optic connections.

Mobile computing device 110 may be a laptop computer, a netbook computer, a tablet computer, an ultrabook computer, a personal digital assistant (PDA), a smart phone, a cell phone, a phone pad, an e-reading device, a media player, or a mobile gaming device. In general, mobile computing device 110 may be an electronic device or a computing system capable of sending and receiving data and communicating with server 120 over network 130. In some embodiments, mobile computing device 110 contains entry aid enabled web browser 112. Mobile computing device 110 contains user interface (UI) 114. UI 114 recognizes user initiated inputs through touchscreen 116, keyboard 117, microphone 118, or other user input methods not listed.

Entry aid enabled web browser 112 operates on mobile computing device 110. Entry aid enabled browser 112 displays a mobile webform (e.g., mobile webform 122) via display device 113 to a user of mobile computing device 110. Entry aid enabled web browser 112 receives data from UI 114. Additionally, entry aid enabled web browser 112 sends and receives information to mobile webform 122, historical data 124, and entry aid program 200.

UI 114 operates on mobile computing device 110 and provides a visual representation of mobile webform 122. UI 114 sends and receives information to entry aid program 200 over network 130. UI 114 enables a user to interact through user interfaces on mobile computing device 110 with mobile webform 122 and entry aid program 200 over network 130. In some embodiments, UI 114 receives data from a user through touchscreen 116. A touchscreen is an electronic visual display a user can control through physical contact with the screen using a specialized pen or a finger. In other embodiments, UI 114 receives data from a user through keyboard 117 (e.g., hardwired, virtual, wireless). A virtual keyboard is a software component typically found on a mobile computing device that allows users to enter characters through a touchscreen. In yet another embodiment, UI 114 receives data through microphone 118 (e.g., built in or add on hardware) and installed voice recognition software (e.g., speech to text software and applications). UI 114 displays information and mobile webform 122 to a user through display device 113. A display device is an output device that visually conveys text, graphics, and video information (i.e., any device capable of displaying a received image (e.g., screen on a smart phone, a touchscreen, a tablet screen, a computer monitor)).

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with mobile computing device 110 over network 130. In other embodiments, server 120 may represent a server computing system utilizing multiple computers as a server system, such as in a cloud computing environment. Server 120 contains entry aid program 200, mobile webform 122, and historical data 124. Mobile webform 122 is an Internet web based form which receives data entries into active webform fields via UI 114 on mobile computing device 110. Historical data 124 includes usage and elapsed time information relative to completing mobile webform 122. Historical data 124 may be stored encompassing the total usage and elapsed time and with respect to each individual data-entry field within mobile webform 122. Historical data 124 is an ongoing collection of individual user data stored on server 120 for analytical purposes.

Figure 1B:
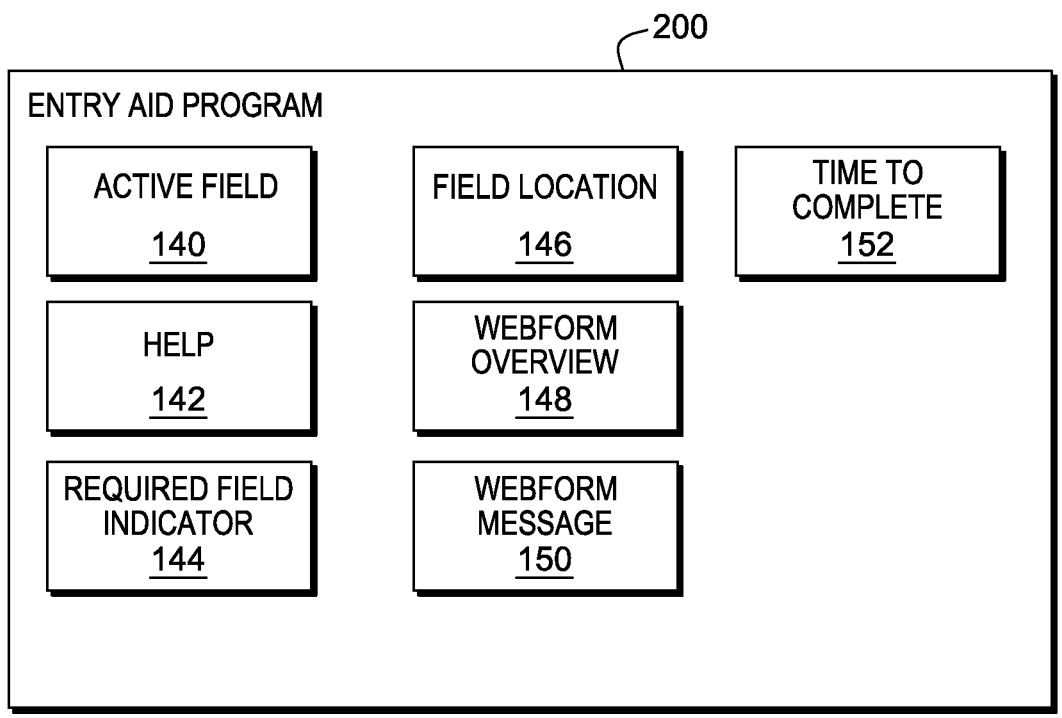
FIG. 1B is a functional block diagram illustrating the components of the invention within server 120 of mobile computing environment of FIG. 1A, in accordance with an embodiment of the present invention.
Figure 3:
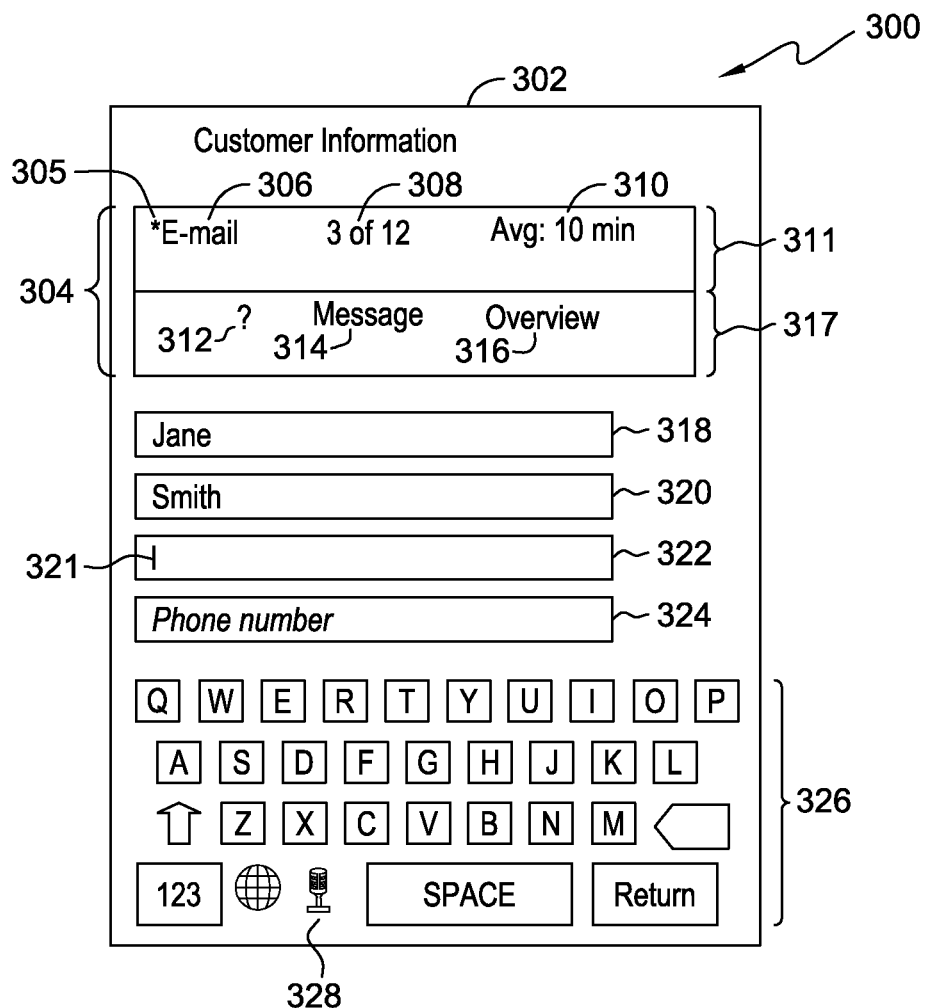
FIG. 3 depicts an example of an entry aid program webform on a mobile computing device, in accordance with an embodiment of the present invention.

FIG. 1B is a functional block diagram illustrating the components of the invention, entry aid program 200, within server 120 of mobile computing environment 100, in accordance with an embodiment of the present invention. In an example embodiment, FIG. 3 depicts mobile computing device 300, which illustrates visual and interactive user support aspects of entry aid program 200.

In the depicted embodiment of the present invention, entry aid program 200 includes active field 140, help 142, required field indicator 144, field location 146, webform overview 148, webform message 150, and time to complete 152. In an example embodiment, entry aid program 200 displays metadata and feedback on mobile computing device 300 within active field information bar 304, depicted separately as feedback bar 311 and user assistance bar 317. Metadata describes the contents and context of data files facilitating the discovery of relevant information.

Active field 140 is the current selected (e.g., via a selection by a user of mobile computing device 110) data-entry field on mobile webform 122. Active field 140 receives data entered through UI 114. In one embodiment, active field 140 receives data as text information. In another embodiment, active field 140 receives data from a computer widget (e.g., drop down menu selections, radio buttons, etc.). In an example embodiment, entry aid program 200 assigns active field 140 the inline label within e-mail data-entry field 322, (e.g., text word "e-mail"), and entry aid program 200 displays the inline label as active field hint 306. Additional data-entry fields capable of being assigned as active field 140 are first name data-entry field 318, last name data-entry field 320, and phone number data-entry field 324. In some embodiments, active field 140 may be an entry field within a wizard application. A wizard application is a type of user interface that presents a user with a sequence of dialog boxes or entry fields that lead the user through a series of defined steps.

Help 142 provides mobile webform 122 assistance upon request by a user. In one embodiment, entry aid program 200 provides help 142 as general webform completion instructions. In another embodiment, entry aid program 200 provides help 142 as information corresponding to active field 140. In an example embodiment, help 142 is accessed through a user selection of the "?" icon representing help 142.

Required field indicator 144 visually represents whether active field 140 is a required field within mobile webform 122 (i.e., an active field necessary for successful submission of a mobile webform) or not a required field. In one embodiment, entry aid program 200 displays required field indicator 144 as an asterisk symbol in front of the active field. In another embodiment, entry aid program 200 displays required field indicator 144 as an asterisk symbol following the active field. In another embodiment, entry aid program 200 displays required field indicator 144 as text in a different font color. In yet another embodiment, entry aid program 200 does not display required field indicator 144, indicating the field is not a required field within mobile webform 122. In an example embodiment, entry aid program 200 displays required field indicator 144 utilizing an "*" icon for required field indicator 305, noting active field 140 in the depicted example is required.

Field location 146 provides an indication of the location of active field 140 with respect to the total number of potential active entry fields in mobile webform 122. In one embodiment, entry aid program 200 displays field location 146 as the number related to active field 140 out of the total number of entry fields (e.g., 1 out of 12). In another embodiment, entry aid program 200 displays field location 146 as the number of remaining entry fields to be completed (e.g., 3 of 12 complete). In some other embodiment, entry aid program 200 displays field location 146 as a percentage (e.g., 25% complete, 75% remaining). In yet some other embodiment, entry aid program 200 displays field location 146 as a progression bar visually displaying progress. In an example embodiment, entry aid program 200 displays field location 146 by field location 308 noting the number of data-entry fields completed relative to the total number of data fields within mobile webform 122 (e.g., 3 of 12).

Webform overview 148 displays an overall image of mobile webform 122. In one embodiment, entry aid program 200 displays webform overview 148 as an overall image of mobile webform 122 with respect to active field 140 and subsequent entry fields. In an example embodiment, entry aid program 200 displays, in its entirety, a reduced image of mobile webform 122 with active field 140 uniquely identified by one color, and the remaining entry fields in a second color. In other embodiments, entry aid program 200 displays webform overview 148 as a wizard application and indicates the active position within a wizard application. Additionally, webform overview 148 provides a method of navigation between entry fields within mobile webform 122. In an example embodiment, webform overview 148 is accessed through a user selection of the word "Overview", (e.g. a selectable option), overview 316.

Webform message 150 displays information about active field 140. In one embodiment, entry aid program 200 displays webform message 150 as additional information indicating how to fill out active field 140. In another embodiment, entry aid program 200 displays webform message 150 as error information received after mobile webform 122 processes an entry in active field 140. In an example embodiment, webform message 150 is accessed through a user selection of the word "Message", message 314.

Time to complete 152 utilizes historical data 124 to calculate the average time to complete mobile webform 122. Time to complete 152 utilizes analytics and averaging (e.g., cumulative moving average, weighted moving average) and recalculates average time to complete 152 as historical data 124 is updated with new user time to complete data. Cumulative moving averages utilize all data up to the current point to create an average. Weighted moving averages are any averages that utilize a multiplying factor to provide different weights to data at different positions. Time to complete 152 may update the time remaining as each data-entry field is completed. In one embodiment, entry aid program 200 may display time to complete 152 as an estimated time remaining based on historical data 124 to complete mobile webform 122 corresponding to active field 140. In another embodiment, upon exceeding time to complete 152, entry aid program 200 may display time to complete 152 as an increasing time.

Figure 2:
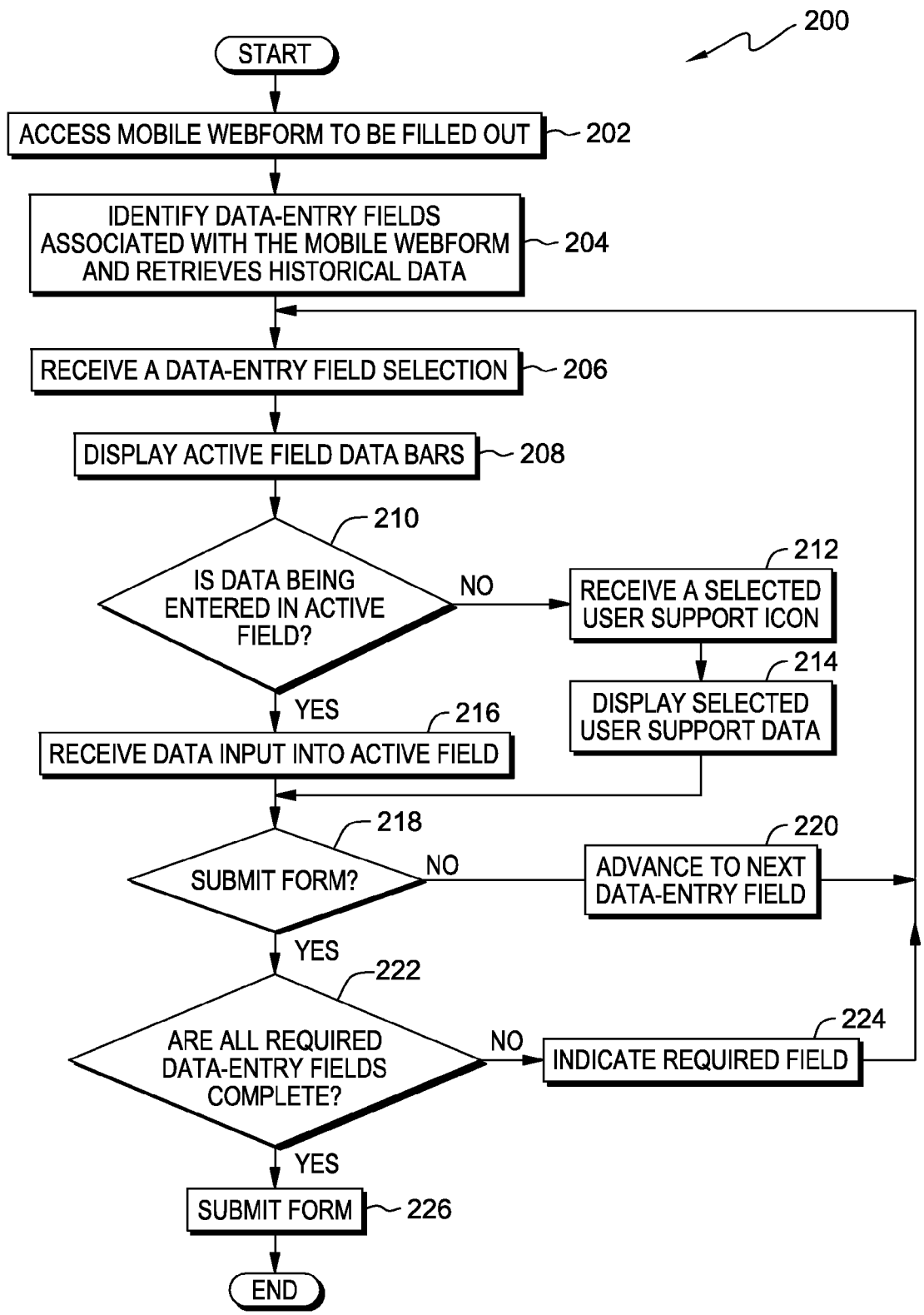
FIG. 2 is a flowchart depicting operational steps of an entry aid program on a server within the mobile computing environment of FIG. 1A and expanded in FIG. 1B, in accordance with an embodiment of the present invention.

FIG. 2 is a flowchart depicting operational steps of entry aid program 200, in accordance with an embodiment of the present invention. Entry aid program 200 utilizes mobile webform 122 and historical data 124 to create a visual display of information relevant to active field 140. FIG. 3 depicts touchscreen device 302, including active field information bar 304, which is an example of a visual display of information relevant to active field 140. Entry aid program 200 assists a user to complete mobile webform 122 via mobile computing device 110. In the depicted embodiment of the invention, entry aid program 200 operates within mobile computing environment 100; however, entry aid program 200 is not limited to mobile devices and can operate in a non-mobile computing environment. User actions on mobile computing device 110 may terminate entry aid program 200 at any step within the embodiment of the present invention.

In step 202, entry aid program 200 accesses mobile webform 122 to be filled out. In one embodiment, entry aid program 200 initiates and accesses mobile webform 122 in response to a user accessing mobile webform 122 through entry aid enabled web browser 112 on mobile computing device 110. In another embodiment, a user accesses a webform through entry aid enabled web browser 112 on a computing device (e.g., desktop computer). In yet another embodiment, a user accesses mobile webform 122 through voice recognition software interacting with entry aid enabled web browser 112.

In step 204, entry aid program 200 identifies data-entry fields associated with mobile webform 122 and retrieves historical data 124. Entry aid program 200 identifies the data-entry fields, both required (e.g., first name, last name, phone number) and non-required (e.g., suffix, title, comments), within mobile webform 122. Entry aid program 200 determines the total number of data-entry fields within mobile webform 122 (i.e., total number encompasses required and non-required data-entry fields). Entry aid program 200 retrieves historical data 124 on server 120 that corresponds to mobile webform 122 (i.e., historical data 124 corresponds to a specific mobile webform 122). In one embodiment, entry aid program 200 retrieves historical data 124, which includes time to complete 152 for the overall mobile webform 122. In another embodiment, entry aid program 200 retrieves historical data 124, which includes time to complete 152 relevant to each active field 140.

In step 206, entry aid program 200, receives a data-entry field selection. In one embodiment, entry aid program 200 automatically selects the first data-entry field within mobile webform 122. In another embodiment, entry aid program 200 receives a selection of a data-entry field within mobile webform 122 via user interface 114 through touchscreen 116, keyboard 117, or microphone 118. In response to receiving a selection of a data-entry field, entry aid program 200 designates the selected data-entry field as the active field within mobile webform 122 (i.e., active field 140). In yet another embodiment, entry aid program 200 receives a completion indication of active field 140 from user interface 114 (e.g., tab or return key entry, vocal advance direction). In response to receiving a completion indication, entry aid program 200 automatically advances and assigns active field 140 to the subsequent data-entry field. In yet another embodiment, entry aid program 200 assigns active field 140 based on a user selection of a data-entry field within webform overview 148. In one embodiment, entry aid program 200 indicates active field 140 through a cursor indicator within a data-entry field of mobile webform 122 (e.g., flashing or steady cursor, depicted by "|", "\", "/", "_"). In an example embodiment with regard to touchscreen device 302, entry aid program 200 depicts cursor indicator 321 within e-mail data-entry field 322 as a steady "|". In another embodiment, entry aid program 200 indicates active field 140 by a variation to the data-entry field box (e.g., border is highlighted, entry field changes color, etc.).

In step 208, entry aid program 200 displays active field data bars 304 relative to active field 140. In an example embodiment, FIG. 3 depicts a visual representation of entry aid program 200 operating on mobile computing device 110. Entry aid program 200 displays active field information bars 304 relative to the current data-entry field, active field 140. Active field information bar 304 may be divided into two sub-component information bars, feedback bar 311 and user assistance bar 317. Within feedback bar 311, entry aid program 200 displays required field indicator 305, active field hint 306, field location 308, and time to complete 310. In some embodiments, active field information bars 304 is read to a user by a screen reader employing text to speech software through speakers on mobile computing device 110 (e.g. audio notification). Within user assistance bar 317, entry aid program 200 displays an icon representing help 312 (e.g., "?"), message 314 (e.g., Message), and overview 316 (e.g., Overview). In one embodiment, entry aid program 200 displays user assistance bar 317 including selectable icons and text and is capable of opening a text window with the related help. In another embodiment, entry aid program 200 displays user assistance bar 317 including selectable icons and text as a hoverbox feature (i.e., related help is automatically displayed in a popup window when a cursor goes over the selected icon or text for a short period of time without clicking on the icon).

In an example embodiment as depicted in FIG. 3, mobile computing device 110 is represented by touchscreen device 302, which includes virtual keyboard 326. Entry aid program 200 assigns active field 140 to be e-mail data-entry field 322. E-mail data-entry field 322 is blank aside from cursor indicator 321 (e.g., "|"), which visually identifies e-mail data-entry field 322 as active field 140. Entry aid program 200 displays information pertaining to active field 140 within active field information bars 304. Within feedback bar 311, entry aid program 200 displays required field indicator 144 (e.g., "*" as required field indicator 305, which indicates that active field 140 is a required data-entry field in mobile webform 122). Entry aid program 200 displays the inline label, associated with active field 140 (e.g., e-mail data-entry field 322) as the text word "e-mail" as active field hint 306 in feedback bar 311. Entry aid program 200 displays field location 146 (e.g., "3 out of 12" as field location 308 (i.e., e-mail data-entry field 322 is the third data-entry field out of twelve total data-entry fields within mobile webform 122)). Entry aid program 200 displays, within feedback bar 311, time to complete 152 (e.g., "Avg: 10 min" as time to complete 310 (i.e., ten minutes remain prior to completion)). For example, time to complete 152 is distributed across the individual data-entry fields, with respect to historical data 124, providing an average time to complete each data-entry field. As data-entry fields are completed (e.g., "3 out of 12"), entry aid program 200 calculates time to complete 152 based on the current location and the average time to complete associated with the remaining data-entry field within mobile webform 122.

Entry aid program 200 displays user assistance bar 317, which includes selectable icons or text. Within user assistance bar 317, entry aid program 200 displays selectable user support data, a "?" icon as help 312 (e.g., help information about active field 140), "Message" as message 314 (e.g., error information corresponding to data entered into active field 140), and "Overview" overview 316 (e.g., an icon that opens an overview of mobile webform 122, including indications of active field 140 and additional data-entry fields).

In decision step 210, entry aid program 200 determines if data is being entered in active field 140. Entry aid program 200 remains at active field 140 until entry aid program 200 receives a user request or an information completion indication (e.g., tab, return character, enter key). In one embodiment, entry aid program 200 determines active field 140 is selected and capable of receiving input through user interface 114 (i.e., entry aid program 200 does not proceed further until receipt of a user-initiated action (e.g., completion indication, selection from user assistance bar 317). In another embodiment, entry aid program 200 receives a request from within user assistance bar 317 (e.g., user selected "?" icon representing help 312, message 314, or overview 316).

If entry aid program 200 determines that data has been entered in active field 140, (decision 210, yes branch) entry aid program 200 proceeds to step 216. If entry aid program 200 determines a selection has been made within user assistance bar 317 (decision 210, no branch), entry aid program 200 proceeds to step 212.

In step 212, entry aid program 200 receives a selected user support icon. Entry aid program 200 receives user support icon selections that are available within user assistance bar 317 through touchscreen 116 (e.g., touch selection), keyboard 117 (e.g., tab and return selection), or microphone 118 (e.g., vocalization command). In an example embodiment, entry aid program 200 receives selections through touchscreen device 302, virtual keyboard 326, or by microphone 328 (i.e., microphone icon 328 is selected on virtual keyboard 326). In one embodiment, entry aid program 200 receives a selection of "?", which represents help 312. In another embodiment, entry aid program 200 receives a selection of message 314. In yet another embodiment, entry aid program 200 receives a selection of overview 316.

In step 214, entry aid program 200 displays selected user support data. Entry aid program 200 displays help 142 based on active field 140 (e.g., e-mail data-entry field 322) in response to a user selecting "?" icon, help 312. In one embodiment, entry aid program 200 displays help 142 as instructions on the format and how to complete active field 140. In an example embodiment, entry aid program 200 displays help 142 in response to a user selecting "?" icon, help 312 as information pertaining to the format of the e-mail address (e.g., e-mail: johndoe@domain.com). In another embodiment, entry aid program 200 displays help 142 explaining why active field 140 is necessary within mobile webform 122. Entry aid program 200 displays webform message 150 (e.g., message 314) based on processed data entered in active field 140 (e.g., e-mail data-entry field 322). In an example embodiment, a user of mobile computing device 110 enters data in e-mail data-entry field 322 incorrectly and selects message 314 and in response, entry aid program 200 displays an error and corrective action message relevant to e-mail data-entry field 322 (e.g., e-mail address required—enter johndoe@domain.com, incorrect format—missing @domain.com). In one embodiment, entry aid program 200 displays webform overview 148 as a superimposed reduced image of mobile webform 122 overlaying the existing display and information. In another embodiment, entry aid program 200 displays webform overview 148 as the entire viewable area of display device 113. In yet another embodiment, entry aid program 200 displays active field 140 within webform overview 148 as a specified color indicating activity and other data-entry fields in a secondary color. In additional embodiments, entry aid program 200 displays a wizard application view, a graphical user interface (GUI) representation of a mobile webform 122 with selectable tabbed pages prompting a user to complete a series of defined steps. In another embodiment, entry aid program 200 identifies active field 140 by highlighting the corresponding tab within the wizard application in one color and other tabs with data-entry fields in a secondary color.

In step 216, entry aid program 200 receives data input into active field 140. Entry aid program 200 receives data input into active field 140 through user interface 114. Entry aid program 200 may receive data input into active field 140 through touchscreen 116 (e.g., touch selection of automatic fill information, touch typing on a virtual keyboard, etc.), keyboard 117 (e.g., typing information), or microphone 118 (e.g., voice recognition software, speech to text, etc.). In an example embodiment, first name data-entry field 318 and last name data-entry field 320 are complete; entry aid program 200 awaits entry of active field 140 (e.g., e-mail data-entry field 322). In the example embodiment, entry aid program 200 receives a valid e-mail entry input into e-mail data-entry field 322 followed by a completion indication (e.g., tab, return character, enter key). In another embodiment, entry aid program 200 receives an invalid entry within active field 140 followed by a completion indication. In some embodiments, entry aid program 200 remains at an invalid entry and supplies webform message 150 with error information. In another embodiment, active field 140 is not a required data-entry field; entry aid program 200 receives a completion indication without a data entry. In yet another embodiment, active field 140 is not required, entry aid program 200 receives data (i.e., data may be valid or invalid) and a completion indication.

In decision 218, entry aid program 200 determines if mobile webform 122 is to be submitted. In one embodiment, entry aid program 200 receives a submission request from the user to submit mobile webform 122, entry aid program 200 processes the submission request and determines that mobile webform 122 is to be submitted. In another embodiment, entry aid program 200 determines the user does not request to submit mobile webform 122, and entry aid program 200 continues to complete mobile webform 122.

If entry aid program 200 determines that mobile webform 122 is to be submitted (decision 218, yes branch), entry aid program 200 proceeds to decision 222. If entry aid program 200 determines that mobile webform 122 is not to be submitted (decision 218, no branch), entry aid program 200 proceeds to step 220.

In step 220, entry aid program 200 advances to the next data-entry field. In one embodiment, entry aid program 200 receives an indication of completion of active field 140 (e.g., tab, return, voice command) via user interface 114. Entry aid program 200 automatically advances to the next data-entry field within mobile webform 122 and assigns active field 140. In another embodiment, entry aid program 200 assigns active field 140 based on a user selection of another data-entry field within mobile webform 122 through user interface 114 (i.e., selection may advance or return to a data-entry field which may or may not have been completed). In yet another embodiment, entry aid program 200 receives active field 140 as a selection of a data-entry field made within webform overview 148. Entry aid program 200 returns to step 206 with a new active field 140, and entry aid program 200 continues with data entry of mobile webform 122. In an example embodiment, a user of mobile computing device 110 enters an e-mail address into e-mail data-entry field 322 followed by the enter key from virtual keyboard 326. Entry aid program 200 automatically advances to the next data-entry field, phone number data-entry field 324. In another example embodiment, a user of mobile computing device 110 selects last name data-entry field 320 (e.g., via touch selection, tab), entry aid program 200 returns to a previous data-entry field, and entry aid program 200 assigns active field 140 to last name data-entry field 320.

In decision 222, entry aid program 200 determines whether all required data-entry fields are complete. In one embodiment, entry aid program 200 determines that all of the required data-entry fields within mobile webform 122 are completed (decision 222, yes branch) and submits mobile webform 122 (step 226). In another embodiment, entry aid program 200 determines that all of the required fields within mobile webform 122 are not complete (decision 222, no branch) and does not submit mobile webform 122.

In step 224, entry aid program 200 indicates a required field. In one embodiment, entry aid program 200 determines that a required data-entry field is incomplete (e.g., a required data-entry field is blank). In an example embodiment, a user of mobile computing device 110 does not enter an e-mail address in e-mail data-entry field 322 and selects submit. Entry aid program 200 determines e-mail data-entry field 322 is required and does not submit mobile webform 122. Entry aid program 200 provides error information in message 314 and resumes active field 140 data collection at e-mail data-entry field 322. In another embodiment, entry aid program 200 selects a required data-entry field with incorrect data entered to be active field 140 (e.g., e-mail address is entered incorrectly). Entry aid program 200 selects the required data-entry field. Entry aid program 200 assigns active field 140 and proceeds to step 206. Entry aid program 200 receives an assigned active field 140 as an entry field selection and resumes data collection for active field 140.

In step 226, entry aid program submits mobile webform 122. Entry aid program 200 submits completed mobile webform 122 to server 120 over network 130. Entry aid program 200 updates historical data 124 with a time to complete mobile webform 122 associated with the user of mobile computing device 110. Entry aid program 200 calculates a time to complete mobile webform 122 associated with the user of mobile computing device 110 utilizing a time stamp with respect to a start time (i.e., initial access time of mobile webform 122) and a stop time (i.e., submission time of mobile webform 122) for incorporation into historical data 124. Entry aid program 200 recalculates time to complete 152 with updates to historical data 124.

Figure 4:
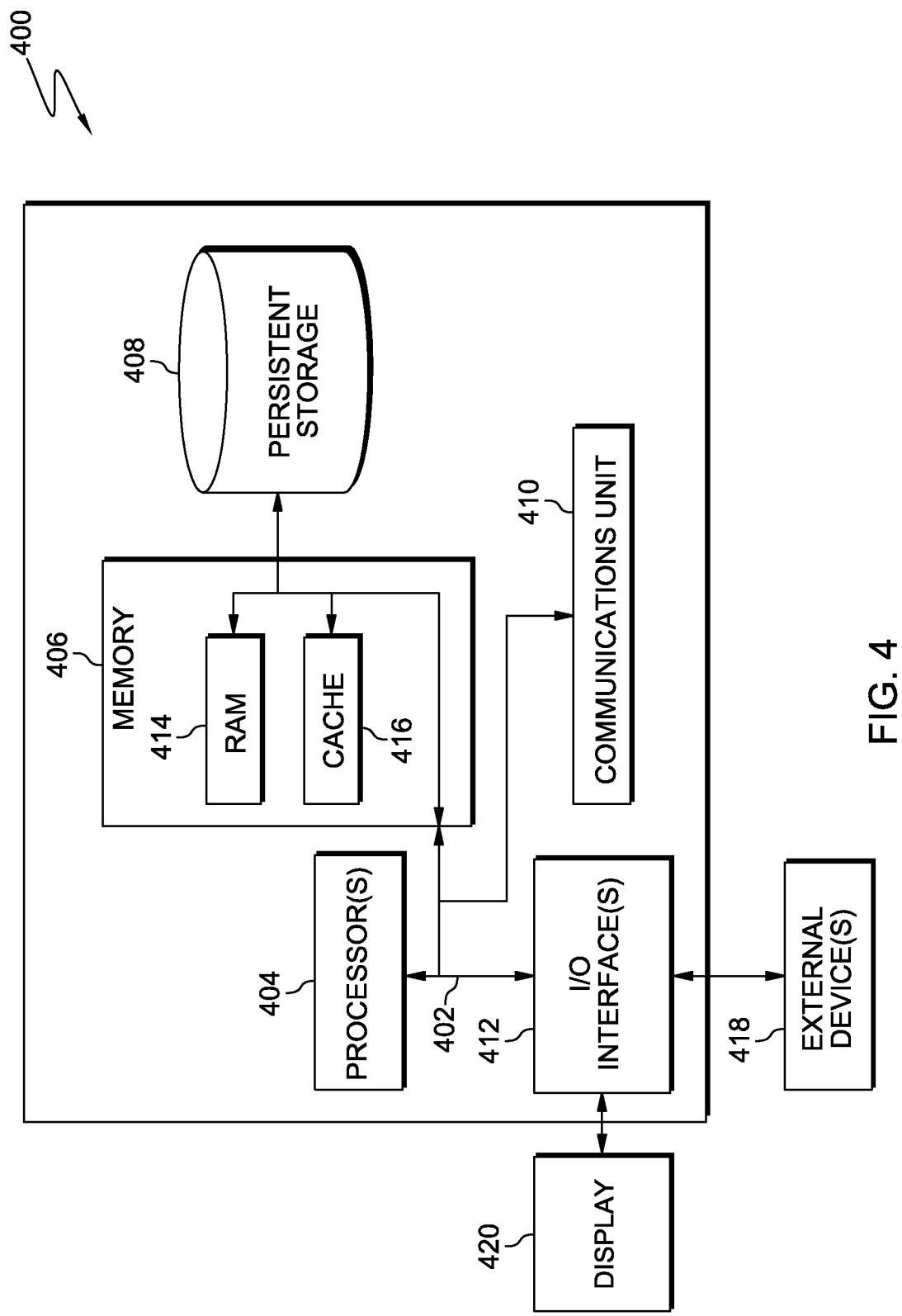
FIG. 4 depicts a block diagram of the components of the computing device, in accordance with an embodiment of the present invention.

FIG. 4 depicts a block diagram of components of mobile computing device 400 which is representative of mobile computing device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Mobile computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Entry aid program 200, mobile webform 122, historical data 124, and entry aid enabled web browser 112 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of an enterprise grid and client devices. In these examples, communications unit 410 includes one or more network interface cards. Communications unit 410 may provide communications through the use of either or both physical and wireless communications links. Entry aid program 200, mobile webform 122, historical data 124, and entry aid enabled web browser 112 may be downloaded to persistent storage 408 through communications unit 410.

I/O interface(s) 412 allows for input and output of data with other devices that may be connected to computing device 400102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., Entry aid program 200, mobile webform 122, historical data 124, and entry aid enabled web browser 112, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing an interface for data entry into a webform, the method comprising:
   receiving, by one or more processors, a selection of an active data-entry field in a webform;
   determining, by one or more processors, an inline label associated with the active data-entry field;
   determining, by one or more processors, which data-entry fields in the webform are required data-entry fields;
   determining, by one or more processors, a location of an active data-entry field within a webform with respect to a total number of active data-entry fields within the webform wherein the total number of active data-entry fields includes the required and non-required data-entry fields;
   calculating, by one or more processors, an estimated amount of time to complete the webform based on historical data for the active data-entry field and the mobile webform;
   displaying, by one or more processors, an interface for the webform that includes information corresponding to the active data-entry field, wherein the information corresponding to the active data-entry field includes the determined inline label, an indication of whether or not the active data-entry field is a required data-entry field, the calculated estimated time to complete the webform, and an indication of the determined location of the active data-entry field with respect to the total number of active data-entry fields within the webform;
   providing by one or more processors, a selectable overview option in the displayed interface for the webform;
   receiving by one or more processors, a selection of the overview option in the displayed interface for the webform; and
   in response to receiving a selection of the overview option, displaying, by one or more processors, a webform overview that displays a reduced image of the entire webform with each data-entry field in the webform and an indication of the location of the active data-entry field within the webform.

2. The method of claim 1, further comprising:
   providing, by one or more processors, a selectable help icon in the interface for the webform;
   receiving, by one or more processors, a selection of the help icon through the interface for the webform; and
   in response to receiving a selection of the help icon, displaying, by one or more processors, help information associated with the active data-entry field.

3. The method of claim 1, further comprising:
   receiving, by one or more processors, data entered into the active data-entry field;
   determining, by one or more processors, the data entered in the active data-entry field includes an error; and
   providing, by one or more processors, a selectable error message in the interface for the webform corresponding to the determined error.

4. The method of claim 1 further comprising:
   receiving, by one or more processors, a selection of a data-entry field from within the webform overview;

navigating, by one or more processors, to the selected data-entry field in the webform;

assigning, by one or more processors, the selected data-entry field to be an updated active data-entry field; and updating, by one or more processors, the provided interface for the webform with the information associated with the updated active data-entry field.

5. The method of claim 1, wherein the historical data for the active data-entry field and the webform includes amounts of time that previous users have taken to complete data-entry fields in the webform and amounts of time that previous users have taken to complete the entire webform.

6. The method of claim 1 further comprising, providing, by one or more processors, an audio notification of the information corresponding to the active data-entry field that is provided in the interface for the webform.

7. A computer program product for providing an interface for data entry into a webform, the computer program product comprising:

one or more computer readable storage media and program instructions stored on the one or more computer readable storage media, the program instructions comprising:

program instructions to receive a selection of an active data-entry field in a webform;

program instructions to determine an inline label associated with the active data-entry field;

program instructions to determine which data-entry fields in the webform are required data-entry fields;

program instructions to determine a location of an active data-entry field within a webform with respect to a total number of active data-entry fields within the webform, wherein the total number of active data-entry fields includes the required and non-required data-entry fields;

program instructions to calculate an estimated amount of time to complete the webform based on historical data for the active data-entry field and the mobile webform; and program instructions to display an interface for the webform that includes information corresponding to the active data-entry field, wherein the information corresponding to the active data-entry field includes the determined inline label, an indication of whether or not the active data-entry field is a required data-entry field, the calculated estimated time to complete the webform, and an indication of the determined location of the active data-entry field with respect to the total number of active data-entry fields within the webform.

8. The computer program product of claim 7, further comprising program instructions, stored on the one or more computer readable storage media, to:

provide a selectable help icon in the interface for the webform;

receive a selection of the help icon through the interface for the webform; and responsive to receiving a selection of the help icon, display help information associated with the active data-entry field.

9. The computer program product of claim 7, further comprising program instructions, stored on the one or more computer readable storage media, to:

receive data entered into the active data-entry field;

determine the data entered in the active data-entry field includes an error; and provide a selectable error message in the interface for the webform corresponding to the determined error.

10. The computer program product of claim 7, further comprising program instructions, stored on the one or more computer readable storage media, to:

provide a selectable overview option in the interface for the webform;

receive a selection of the overview option in the interface for the webform; and responsive to receiving a selection of the overview option, display a webform overview that displays a reduced image of the entire webform with each data-entry field in the webform and an indication of the location of the active data-entry field within the webform.

11. The computer program product of claim 10, further comprising program instructions, stored on the one or more computer readable storage media, to:

receive a selection of a data-entry field from within the webform overview;

navigate to the selected data-entry field in the webform;

assign the selected data-entry field to be an updated active data-entry field; and update the provided interface for the webform with the information associated with the updated active data-entry field.

12. The computer program product of claim 7, wherein the historical data for the active data-entry field and the webform includes amounts of time that previous users have taken to complete data-entry fields in the webform and amounts of time that previous users have taken to complete the entire webform.

13. The computer program product of claim 7, further comprising program instructions, stored on the one or more computer readable storage media, to:

provide an audio notification of the information corresponding to the active data-entry field that is provided in the interface for the webform.

14. A computer system for providing an interface for data entry into a webform, the computer system comprising:

one or more computer processors;

one or more computer readable storage media;

program instructions stored on the computer readable storage media for execution by at least one of the one or more processors, the program instructions comprising:

program instructions to receive a selection of an active data-entry field in a webform;

program instructions to determine an inline label associated with the active data-entry field;

program instructions to determine which data-entry fields in the webform are required data-entry fields;

program instructions to determine a location of an active data-entry field within a webform;

program instructions to calculate an estimated amount of time to complete the webform based on historical data for the active data-entry field and the mobile webform that includes at least one of the following: updating the calculated estimated time to complete as each data-entry field is completed, calculating an estimated time remaining as each data-entry field is completed, and an increasing time upon exceeding the calculated estimated time to complete by calculating a time to complete utilizing time stamps with respect to a start time and a stop time; and program instructions to display an interface for the webform that includes information corresponding to the active data-entry field, wherein the information corresponding to the active data-entry field includes the determined inline label, an indication of whether or not the active data-entry field is a required data-entry field, the calculated estimated time to complete the webform, and an indication of the determined location of the active data-entry field within the webform.

15. The computer system of claim 14, further comprising program instructions, stored on the one or more computer readable storage media, to:

provide a selectable help icon in the interface for the webform;

receive a selection of the help icon through the interface for the webform; and responsive to receiving a selection of the help icon, display help information associated with the active data-entry field.

16. The computer system of claim 14, further comprising program instructions, stored on the one or more computer readable storage media, to:

receive data entered into the active data-entry field;

determine the data entered in the active data-entry field includes an error; and provide a selectable error message in the interface for the webform corresponding to the determined error.

17. The computer system of claim 14, further comprising program instructions, stored on the one or more computer readable storage media, to:

provide a selectable overview option in the interface for the webform;

receive a selection of the overview option in the interface for the webform; and responsive to receiving a selection of the overview option, display a webform overview of the entire webform wherein the webform overview displays each data-entry field in the webform and an indication of the location of the active data-entry field within the webform.

18. The computer system of claim 17, further comprising program instructions, stored on the one or more computer readable storage media, to:

receive a selection of a data-entry field from within the webform overview;

navigate to the selected data-entry field in the webform;

assign the selected data-entry field to be an updated active data-entry field; and update the provided interface for the webform with the information associated with the updated active data-entry field.

19. The computer system of claim 14, further comprising program instructions, stored on the one or more computer readable storage media, to:

provide an audio notification of the information corresponding to the active data-entry field that is provided in the interface for the webform.

* * * * *